US009531838B1

(12) United States Patent
Britto et al.

(10) Patent No.: US 9,531,838 B1
(45) Date of Patent: *Dec. 27, 2016

(54) PREDICTIVE PREFETCHING OF DATA FROM REMOTE CLIENT-STATE CACHE FROM SERVER TO UPDATE LOCAL CLIENT-STATE CACHE

(71) Applicant: Versata Development Group, Inc., Austin, TX (US)

(72) Inventors: Jude Arvind Britto, Bangalore (IN); Rajasekhar Vinnakota, Hyderabad (IN); David Franke, Austin, TX (US); Douglas Stuart Gray, Austin, TX (US); Deepti Gupta, Pune (IN)

(73) Assignee: Versata Development Group, Inc., Austin, TX (US)

( * ) Notice: Subject to any disclaimer, the term of this patent is extended or adjusted under 35 U.S.C. 154(b) by 304 days.

This patent is subject to a terminal disclaimer.

(21) Appl. No.: 14/199,895

(22) Filed: Mar. 6, 2014

Related U.S. Application Data

(60) Division of application No. 13/230,691, filed on Sep. 12, 2011, now Pat. No. 8,832,184, which is a continuation of application No. 11/691,300, filed on Mar. 26, 2007, now Pat. No. 8,019,811.

(60) Provisional application No. 60/744,388, filed on Apr. 6, 2006.

(51) Int. Cl.
*G06F 15/16* (2006.01)
*H04L 29/06* (2006.01)

(52) U.S. Cl.
CPC .................................... *H04L 67/42* (2013.01)

(58) Field of Classification Search
CPC .................... H04L 29/08522; H04L 29/08594; H04L 67/142
USPC ........................................ 709/203, 223, 226
See application file for complete search history.

(56) References Cited

U.S. PATENT DOCUMENTS

| 5,832,522 A | 11/1998 | Blickenstaff et al. |
| 5,889,530 A * | 3/1999 | Findlay ................. G06F 11/324 345/440 |
| 6,175,864 B1 | 1/2001 | Addison et al. |
| 6,421,733 B1 | 7/2002 | Tso et al. |
| 6,430,730 B1 | 8/2002 | Ghatate et al. |
| 6,766,348 B1 | 7/2004 | Combs et al. |
| 7,082,454 B1 | 7/2006 | Gheith |
| 7,409,577 B2 | 8/2008 | Wing et al. |

(Continued)

OTHER PUBLICATIONS

Notice of Allowance dated May 12, 2011, mailed in U.S. Appl. No. 11/691,300, pp. 1-8.

(Continued)

*Primary Examiner* — El Hadji Sall

(57) ABSTRACT

Response delay associated with a state-based client-server application can be reduced with utilization of an application state server-side cache. A server caches data for a set of one or more possible states of a client-server application that may follow a current state of the application. The server rapidly responds to a client request with data that corresponds to an appropriate new state of the application in accordance with the application state server-side cache. The server determines that the application will transition to the appropriate new state from the current state of the application with the application state server-side cache based, at least in part, on an operation indicated by the client request.

13 Claims, 9 Drawing Sheets

(56) References Cited

U.S. PATENT DOCUMENTS

2001/0047393 A1  11/2001  Arner et al.
2002/0161908 A1  10/2002  Benitez et al.

OTHER PUBLICATIONS

Petition Decision dated Apr. 15, 2011, mailed in U.S. Appl. No. 11/691,300, pp. 1-2.
Appeal Brief as filed in U.S. Appl. No. 11/691,300 on Dec. 7, 2010, pp. 1-27.
Petition to Withdraw Holding of Abandonment as filed in U.S. Appl. No. 11/691,300 on Nov. 8, 2010, pp. 1-19.
Pre-Appeal Conference Decision dated Jun. 7, 2010, mailed in U.S. Appl. No. 11/691,300, pp. 1-2.
Pre-Appeal Brief Request for Review as filed in U.S. Appl. No. 11/691,300 on Apr. 19, 2010, pp. 1-5.
Advisory Action dated Mar. 23, 2010, mailed in U.S. Appl. No. 11/691,300, pp. 1-4.
Response to Final Office Action dated Nov. 18, 2009, as filed in U.S. Appl. No. 11/691,300 on Feb. 18, 2010, pp. 1-12.
Final Office Action dated Nov. 18, 2009, mailed in U.S. Appl. No. 11/691,300, pp. 1-13.
Response to Non-Final Office Action dated Feb. 17, 2009, as filed in U.S. Appl. No. 11/691,300 on Aug. 17, 2009, pp. 1-11.
Non-Final Office Action dated Feb. 17, 2009, mailed in U.S. Appl. No. 11/691,300, pp. 1-24.
Notice of Allowance dated Jul. 7, 2014, mailed in U.S. Appl. No. 13/230,691, pp. 1-2.
Notice of Allowance dated May 8, 2014, mailed in U.S. Appl. No. 13/230,691, pp. 1-11.
Response to Notice of Non-Compliant Amendment dated Jan. 30, 2014, as filed in U.S. Appl. No. 13/230,691 on Feb. 28, 2014, pp. 1-9.
Notice of Non-Compliant Amendment dated Jan. 30, 2014, mailed in U.S. Appl. No. 13/230,691, pp. 1-2.
Response to Restriction Requirement dated Nov. 26, 2013, as filed in U.S. Appl. No. 13/230,691 on Jan. 27, 2014, pp. 1-6.
Restriction Requirement dated Nov. 26, 2013, mailed in U.S. Appl. No. 13/230,691, pp. 1-7.
Response to Non-Final Office Action dated Feb. 28, 2013, as filed in U.S. Appl. No. 13/230,691 on Aug. 28, 2013,2 pp. 1-18.
Non-Final Office Action dated Feb. 28, 2013, mailed in U.S. Appl. No. 13/230,691, pp. 1-18.

* cited by examiner

Product Family

■ Use Filter  Type: Server   OS: Everest UNIX

| Sort | Product Family | Max CPUs | Memory | Max I/O Slots | Average Price |
|---|---|---|---|---|---|
| ● | Everest Series 200 | 1 | 32 to 512 MB | 3 (2 PCI, 1 PCI/EISA) | 13500 |
| ○ | Everest Series 900 | 8 | 64 to 4096 MB | 6 (4 PCI, 2 PCI(EISA) | 85000 |

A low-end NT/Unix server with maximum 2 CPUs (Undo)   (<Back) (Next>)   (Finish)   (Cancel)

System Type
Product Family

PREDICTIVE PREFETCHING OF DATA FROM REMOTE CLIENT-STATE CACHE FROM SERVER TO UPDATE LOCAL CLIENT-STATE CACHE

CROSS-REFERENCE TO RELATED APPLICATIONS

This application is a divisional of and claims the benefit of U.S. patent application Ser. No. 13/230,691, filed Sep. 12, 2011, which application is a continuation of and claims the benefit of U.S. patent application Ser. No. 11/691,300, filed Mar. 26, 2007, now U.S. Pat. No. 8,019,811, issued Sep. 13, 2011, which application claims benefit under 35 U.S.C. §119(e) of U.S. Provisional Patent Application No. 60/744,388, filed Apr. 6, 2006, which applications are incorporated herein by reference.

BACKGROUND

Field of the Invention

The present invention is generally directed to a client-server system and, more particularly to a technique for improving response time of a user interface associated with a state-based client-server application.

Description of the Related Art

As is well known, a client-server system is a network architecture that separates a client from a server. In general, client-server systems are used to provide a scalable architecture for distributed computing. Typically, server software is installed and runs on a relatively powerful computer system or on systems which have access to databases or other information resources. Often, server systems are centrally maintained. Client software, on the other hand, is generally installed and run on personal computers (PCs) or workstations. Often, client systems are geographically or organizationally distributed.

Web-based applications are often implemented using a client-server model. For example, in a typical web-based client-server system, a client employs a web browser that facilitates communication with servers that supply information commonly associated with various websites. For example, a user of a client may display information from a news website by entering a uniform resource locator (URL) of the website into the web browser of the client. The website server finds the information required to display a requested article and assembles the article into a web page, which is sent to the web browser of the client to allow the user to read the requested article. In general, a server waits for requests and, upon receiving a request, serves the request by sending an appropriate reply to a requesting client. In such a web-based application, a client sends requests corresponding to user input, received by the client, via a user interface (UI), to a server. The client waits to receive a reply and upon receiving a reply to the request updates a display of the UI accordingly.

In general, client-server protocols may be stateless or state-based. In general, a stateless server does not keep client specific information between requests, e.g., a hyper text transfer protocol (HTTP) server for static hyper text markup language (HTML) pages. Rather, requests are each independently serviced based on information supplied by the client. On the other hand, a state-based server maintains client session specific information between requests from that client. For example, in a web-based system for configuring an automobile for purchase, a state-based server may maintain information regarding selections (e.g., model, engine, transmission, color, options, etc.) selected so far. In this way actions and responses of the server can be tailored to a current session context.

Frequently, in client-server applications, a user of a client will experience a noticeable delay between requesting information and the information being provided to a display of a user interface (UI) of the client. A typical client-server web application usage includes the following steps: (1) a web-based application presents a UI in response to a user entering a URL into a web browser; (2) the user manipulates the web-based application via the UI by entering data into data fields, selecting various buttons, etc.; (3) information corresponding to the user manipulation is transferred to the server; (4) the server performs computations and moves the application into a new state; (5) the server then provides information to the client in reply; and (6) finally the client updates the UI with the received information. State-based UI techniques have been employed to streamline server-side processing or to provide more sophisticated client-side functionality.

Unfortunately, in many cases, a user of a client may experience a significant delay between manipulation of the UI and update of the UI. The delay in update of the UI may be attributed to a number of different factors. For example, the delay may be attributed to server processing time required for generating a next state, based on user input; network bandwidth constraints; network latency delays; and complete refresh of the UI.

A number of different techniques have been implemented within a client-server context in an attempt to improve update times of a client user interface (UI). For example, web browser-based client UIs have been asynchronously updated without requiring a complete refresh of the UI by using a scripting language, such as JavaScript, or by using a plug-in such as Adobe Flash. Using this approach, data has been transferred from the server in the form of an extensible markup language (XML), e.g., asynchronous JavaScript and XML (AJAX), or a proprietary format, such as actionscript message format (AMF) in the case of Flash. The results of client operations have also been retrieved from a linear server-side cache and the client has then been served the data representing the results without the delay caused by server processing. Unfortunately, this approach usually cannot handle a complex interdependent sequence of user operations in the case where server processing is necessary to put the application in a correct state.

In order to reduce the amount of data transferred between a server and client, efficient data transfer formats have also been implemented. For example, if the client-server communication protocol uses XML, it can be compressed to a fraction of its size. Moreover, compact formats such as JavaScript Object Notation (JSON), or efficient binary formats such as AMF can be used in the case of JavaScript or Flash-based clients. However, the extra load on the client and server, as well as the time taken to handle the compression/encoding of the data to be transferred, may still result in undesirable update times for a UI. Thus, none of the existing approaches satisfactorily address the various problems listed above. In particular, the approaches described above do not address the problem of delay due to large network latency.

What is needed is a technique for improving user experiences with state-based client-server applications, such as configuration software, through the reduction of delay between a user action and an associated update of a user interface.

SUMMARY

It has been discovered that a server in a client-server system can reduce the delay in response to client requests for updates for a state-based client-server application. A server maintains an application state server-side cache. The application state server-side cache indicates response data for corresponding ones of a plurality of states of the application. The server responds to a client request with data that corresponds to a new state that results from an operation indicated by the client request. The server determines the new state based on the current state and the operation indicated by the client request with the application state server-side cache, unless the application state server side cache does not represent the new state of the application. If the application state server-side cache does not represent the new state, then the server processes the client request and the operation to generate the data for the new state, and responds with the generated data. Hence, maintaining an application state server-side cache that represents at least a new state, and possibly one or more subsequent states of the application that may follow the new state, and responding to a client request with data from the application state server-side cache, at least avoids delay introduced by the processing of the client request. A server may process the client request to perform the operation separately or concurrently with accessing the application state server-side cache to retrieve appropriate data if available. The server performs the operation indicated in the client request to update an internal state of the application, to compute possible future states of the application, etc.

BRIEF DESCRIPTION OF THE DRAWINGS

The present invention may be better understood, and its numerous objects, features, and advantages made apparent to those skilled in the art by referencing the accompanying drawings.

FIGS. 5A-5B are screen dumps from an exemplary state-based client-server application.

The use of the same reference symbols in different drawings indicates similar or identical items.

DESCRIPTION OF EMBODIMENT(S)

Figure 1:
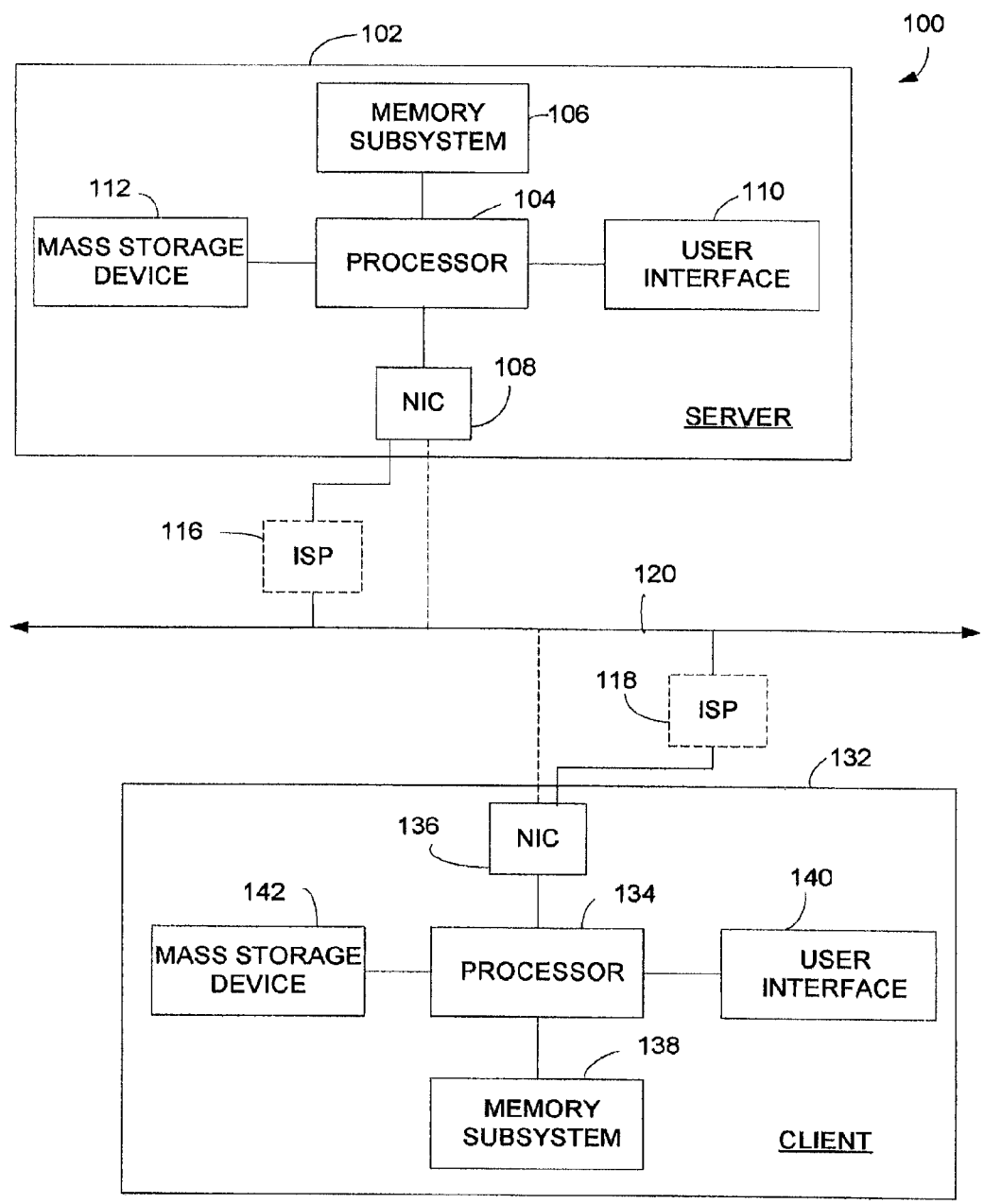
FIG. 1 is an electrical block diagram of an exemplary client-server system.

Various embodiments are directed to a state-based client-server system having a client user interface (UI) with improved response time. As previously noted, when an application that is state-based moves through a sequence of states, operations performed at a current state cause a transition to a next state. Such applications may maintain multiple sessions, each with a current state. In this situation, a display of the UI displays a representation of the current state of the application, or a session in the application. Operations performed in a client are sent to a server as a request where the operations are processed causing the application or session to move into a new state. New state data representing the new state is sent to the client as a response. The client then uses the new state data to update its UI. It should be appreciated that the present invention may be exploited in a variety of applications and/or systems in which UI paths include at least some paths (or portions thereof) that are frequently (or predictably) followed based on a usage pattern.

One example of a state-based client-server application is a web-based wizard that guides a user through multiple screens, containing interdependent control choices, to perform a configuration. For example, a state-based client-sever application may allow a user to configure an automobile, computer system, etc. One example of a configuration system for which various aspects of the present invention are generally applicable is disclosed in U.S. Pat. No. 6,430,730 entitled "FLASH CONFIGURATION CACHE," which is hereby incorporated herein by reference in its entirety. However, it should be appreciated that these techniques are broadly applicable to a wide range of state-based client-server applications that may not include configuring a particular device.

Causes of delay in user response may be addressed in a number of different ways, or in a combination of ways. For example, storing of incremental state difference data in the cache, rather than as complete states, may be implemented in one or more embodiments. Furthermore, the use of hierarchical caches for storing sequences of operations and responses may be implemented to address delay in user response. In addition, various techniques may be employed for limiting the size of a given server-side cache.

Portions of a client-side cache may be prefetched in order to be able to serve the response without the delay caused by a server trip. As used herein, the term "prefetch" generally refers to providing information to a client-side cache, before an input associated with the information has been received via a client user interface (UI). It should be appreciated that the major benefits of this technique are provided when a user follows a path that has already been cached by previous use. In a state-based client-server application, a client displays a representation of a current state of the application at any point in time using, for example, state data in a standard format. Thus, the client is capable of using state difference data to update the UI without causing a complete refresh of a display of the UI. When a client input (action) is performed at the client, a response to the input containing state difference data may be available in the client-side cache. If the information is found in a client-side cache it may be used to update the display of the UI immediately. If the information is not available in the client-side cache, it is requested from the server.

When the server receives a request, the server attempts to serve the result using the server-side cache. If the server-side cache contains the information, the server processes the request and sends the response immediately. If the information is not contained within the server-side cache, the server processes the request and sends the response, updating the server-side cache with the information. During cache updates, the size of the server-side cache may be kept in check by discarding the least frequently used (LFU) operation sequences, as is discussed in further detail herein.

When an input is received via a UI of the client, data for the next few levels of possible operations is also prefetched to the client. Thus, the current state of the UI and the data corresponding to the next few levels of possible operations constitute the contents of the client-side cache. According to various embodiments, in a typical usage scenario, most user requests can be handled by the client-side cache which results in a reduction of the average response time for updating the UI.

With reference to FIG. 1, an exemplary client-server system 100 is depicted that includes a server 102 and a client 132 that are coupled together via a network 120, which may be, for example, the Internet or an intranet. The server 102 includes a processor 104 coupled to a memory subsystem 106, a user interface 110, a mass storage device 112 and a network interface card (NIC) 108. As is shown, the NIC 108 may be coupled directly to the network 120 or may be coupled to the network 120 through an internet service provider (ISP) 116, or other entity. Similarly, the client 132 includes a processor 134 coupled to a memory subsystem 138, a user interface 140, a mass storage device 142 and a NIC 136. The client 132 may be directly coupled to the network 120 or coupled to the network 120 via an ISP 118, or other entity. The user interface 140 of the client 132 may include a display, e.g., a cathode ray tube (CRT), or a liquid crystal diode (LCD) display, a keyboard and a mouse and/or other graphical input device. Alternatively, the user interface 140 may be, for example, a touch screen. Both the server 102 and the client 132 include tree-structured hierarchical caches.

The caches may be, for example, implemented within the memory subsystems 106 and 138 and/or within the processors 104 and 134. The hierarchical caches store a current state of the application, as well as one or more next levels of the state of the application. Thus, as opposed to implementing a flat cache that can only receive data based on a current state of operations, embodiments implement hierarchical caches. Nodes of the hierarchical caches represent a state of the application and edges of the caches represent possible operations that can be performed when in a given one of the states. The nodes may contain information on the difference in state from the previous node. In one or more embodiments, in addition to implementing hierarchical caches, both the client and the server implement an operation queue. Providing the operation queue at the server-side insures that the internal state of the system gets updated by performing the client actions in a correct order and, in this manner, the server maintains a proper current state of the client UI. The client-side operation queue is also maintained such that in the event that a request has not yet been serviced by the server, any subsequent operations are stored in the client-side operation queue. Additionally, storing client operations that correspond to client-side cache hits allow the server to maintain the proper current state of the client. Upon receiving a reply to a previous request, the entries in the client-side operation queue may be provided to the server in a batch request. That is, multiple ones of the entries may be provided to the server in a single request. In at least one embodiment, the client-side operation queue is managed by a separate thread.

In order to keep the size of the prefetch data small, data for operations that are most likely to be performed next are collected from the server-side cache (or from another server store) and provided to the client-side cache. Such a procedure may be implemented by, for example, maintaining entries in the server-side cache that correspond to the number of instances an operation has been performed on an application or the number of instances an operation has been performed since the sever-side cache was created (e.g., copied over from another cache, or generated by parsing log files of operations on the application). An operation may then be chosen to be prefetched depending upon the frequency with which it has been performed in the past, its depth in the cache with respect to the current state, and whether it represents an incremental change to the state or a complete one. It should be appreciated that the described criteria are examples, and that data may be prefetched according to various other criteria. Exemplary pseudocode for the prefetch subroutine with explanatory comments is set forth below.

```
subroutine getPrefetchTree( ) {
    availableSpace = number of nodes that should be prefetched
    currentState = node representing the current state of the
                   application in the server side cache
    prefetchTree = empty prefetch tree
    set currentState as root of prefetchTree
    currentLevelNodes = empty list of nodes
    add currentState to currentLevelNodes
    while (availableSpace > 0)  {
        nextLevelNodes =
        CALL processNextLevelNodes(prefetchTree,
                       availableSpace, currentLevelNodes)
        currentLevelNodes = nextLevelNodes
    }
    return prefetchTree
}
subroutine processNextLevelNodes(prefetchTree, availableSpace,
                                  currentLevelNodes) {
    nextLevelNodes = collect all children from nodes in
                     currentLevelNodes
    sortedNextLevelNodes = sort nextLevelNodes in decreasing
                           order of frequency of use
    while ((sortedNextLevelNodes has more elements) &&
           (availableSpace > 0))  {
        nextNode = get next node from sortedNextLevelNodes
        // this causes only incremental change to the
        // current state
        if (nextNode is transition or error node)  {
            parentNode = find parent of nextNode in prefetchTree
            add nextNode as child of parentNode
            if (nextNode is not already marked as prefetched)  {
                add state information to nextNode
                decrement availableSpace by space occupied by nextNode
                mark nextNode as prefetched
            }
        }
    }
    return sortedNextLevelNodes
}
```

As can be deduced from the pseudocode above, when prefetch data for a particular operation is requested (using getPrefetchTree( )), the sub-tree starting from that node is explored level by level. At each level, nodes with the highest frequency of usage are collected and put into the prefetch cache structure. This is done by enclosing the node in a data structure, several of which form the prefetch cache tree. A maximum number of nodes is added to the structure. The structure is then converted into XML which is sent to the client-side cache as prefetch data. Thus, at any instant in time, the client-side cache represents a subset of operations that may be performed from the current state to the next few levels. In this manner, the next possible operations will be children of the root node. The children of a node are stored in a structure, such as a hash table (e.g., an instance of a Java® HashMap), that allows quick retrieval given the operation. In one example, the client sends over information about the nodes which are already in the client-side cache. In another example, the server keeps track of all nodes that have been prefetched for a particular session and uses the information to determine whether a new node is to be prefetched.

It should be appreciated that a number of different strategies may be utilized to determine what should be prefetched. An example of one such strategy allows a certain number of new nodes to be prefetched responsive to each operation. For example, all nodes in a particular level may be prefetched before moving to a next level. Certain nodes that are determined to contain large amounts of data may be counted as more than one node during prefetch. When a node is encountered that has already been prefetched to the client, the data of this node is not sent again. Such a node can be utilized as a placeholder node to allow the client to merge new prefetched data in the client-side cache. The client-side cache may be updated at each stage so that it consumes a small amount of memory. Exemplary pseudocode for merging new prefetched data in the client-side cache is set forth below:

```
prefetchTree = getPrefetchTree( )
cacheTree = the client side cache tree
// the current state of the client cache may be different
// from the root of the prefetch tree, because more operations
// using the client cache may have been performed after a
// request for prefetch data has been sent
newPrefetchTreeRoot = find node in prefetchTree that
                     represents the same state as the root
                     of the cache tree
modify prefetchTree to contain only the subtreee rooted at
    newPrefetchTreeRoot
CALL mergecache (root of prefetchTree, root of cacheTree)
subroutine mergecache (currentPrefetchTreeNode,
                     currentCacheTreeNode)  {
    prefetchChildren = list of children of
                     currentPrefetchTreeNode
    for each (prefetchChild in prefetchChildren)  {
        currentOperation = get operation currentPrefetchTreeNode
                         that causes transition to
                         prefetchChild
        cacheChild = get child of currentCacheTreeNode mapped
                     under currentOperation
        if (cacheChild is null)  {
            cacheChild = create new cache node with data from
                         prefetchChild
            add cacheChild as child of currentCacheTreeNode
mapped
                  under the operation currentOperation
        }
        CALL mergecache(prefetchChild, cacheChild)
    }
}
```

The root of the client-side cache represents the current state of the UI. The children from the root of the client-side cache represent the possible states from the current state. When a user performs an operation and it is found in the client-side cache, the node corresponding to this edge is made the new root and all sub-trees which emanate from all other children of the previous root may then be deleted. The client-side cache is essentially a smaller subset of the server-side cache, although each node in the server-side cache contains more information than a corresponding node in the client-side cache. For example, each node of the server-side cache may contain information such as the number of visits, since nodes more frequently visited are generally better candidates for prefetch, and may include a timestamp which may be utilized for pruning.

Figure 2A:
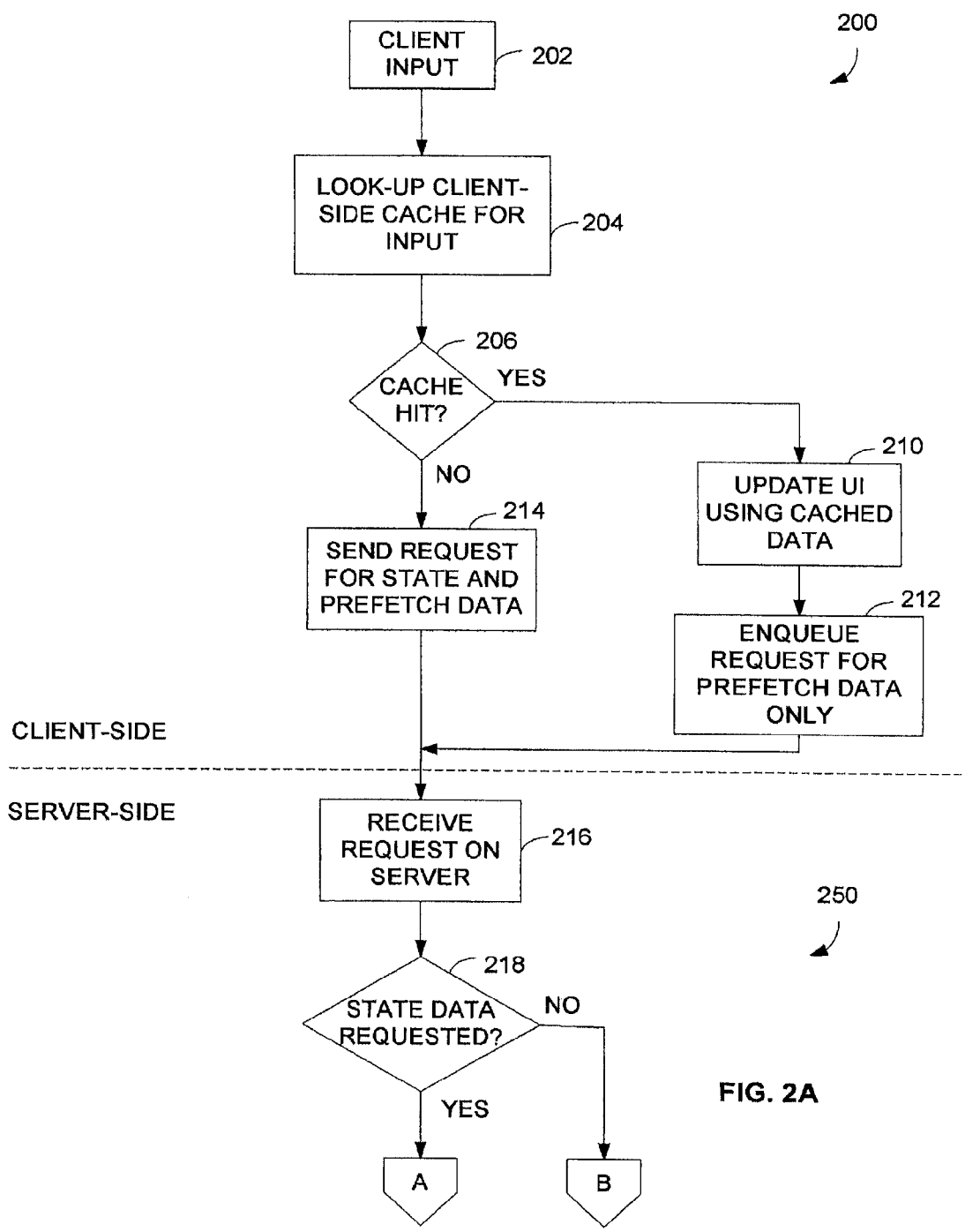
FIGS. 2A-2B are an exemplary flow chart of client-side process and a server-side process, implemented according to an embodiment of the present invention.
Figure 2B:
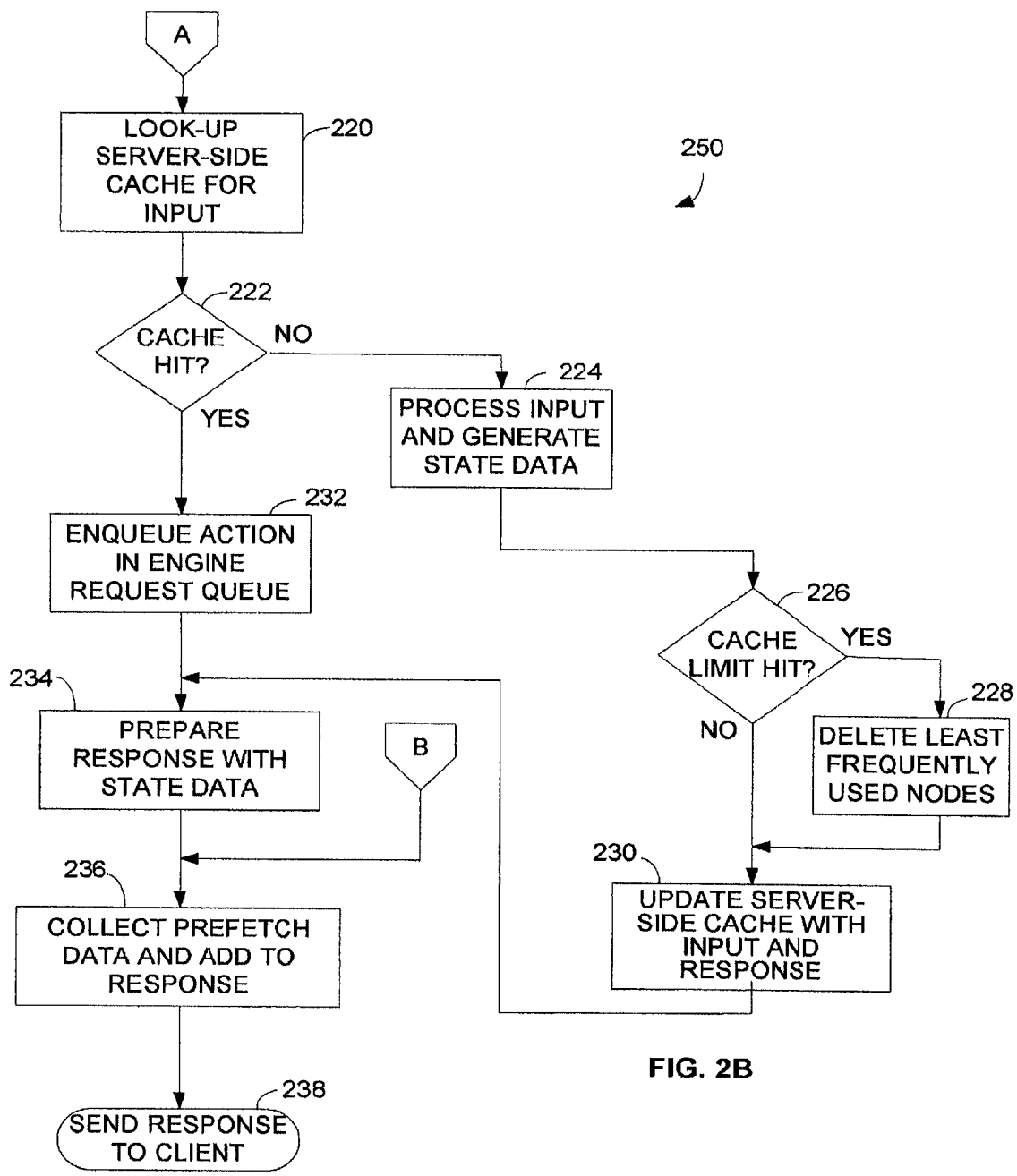

With reference to FIGS. 2A and 2B, an exemplary client-side routine 200 and an exemplary server-side routine 250 are depicted. With specific reference to FIG. 2A, at block 202 client input is received by a state-based application. Next, at block 204, a look-up is done on the client-side cache based on the input to determine whether an operation corresponding to the input is present in the client-side cache. As previously noted, the client-side cache contains a subset of the information stored in the server-side cache. Next, in decision block 206 it is determined whether a cache hit in the client-side cache has occurred. If so, control transfers to block 210 where the client user interface (UI) is updated using the cached data. Next, in block 212, a request for prefetch data is queued in a client-side operation queue. In decision block 206 when a cache miss occurs, control transfers to block 214. In block 214 the client sends a request to the server for state and prefetch data. The request may include a parameter (for example, cacheOnly) that is used to differentiate the type of request. For example, when the client only requires prefetch data, the parameter may be set to true. Otherwise, the parameter may be set to false.

In either case, the client sends a list of actions performed by the user on the client to the server, such that the server may maintain an internal state of the application correctly. At block 216, the server receives the request. Next, in decision block 218, the server determines whether the request is a request for state data. If so, control transfers from block 218 to block 220, where the server performs a lookup from the server-side cache for the input. If state data corresponding to the input is present in the server-side cache, a cache hit is indicated in decision block 222. In block 222 when a cache hit occurs, control transfers to decision block 232 where the action is queued in an operation queue of the server. As previously discussed, it is desirable to queue operations even when a hit occurs such that the server can maintain a proper state with respect to the client. Next, in block 234, the server prepares a response with the state data. Then, in block 236, the server collects the prefetch data and adds it to the state data to be provided in a response. From block 236 control transfers to block 238, where the server sends a response to the client.

In block 218, when state data is not requested, control transfers directly to block 236 where the server collects appropriate prefetch data and adds it to the response to the client and then transfers control to block 238. In block 222, when a cache hit does not occur in the server-side cache, control transfers to block 224 where the server processes the input and generates the state data corresponding to the input before transferring control to decision block 226. In block 226, the server determines whether the server-side cache limit size has been exceeded. If so, control transfers to block 228 where the server deletes least frequently used (LFU) nodes, according to a predetermined routine. From block 228, control transfers to block 230 where the server-side cache is updated with the input and response, at which point control transfers to block 234. In block 226, when the server-side cache limit has not been exceeded, control transfers directly to block 230. Accordingly, techniques are described above (and elsewhere herein) that may be exploited to maintain a hierarchical client-side cache and a hierarchical server-side cache to facilitate improved update of a client UI.

Figure 3A:
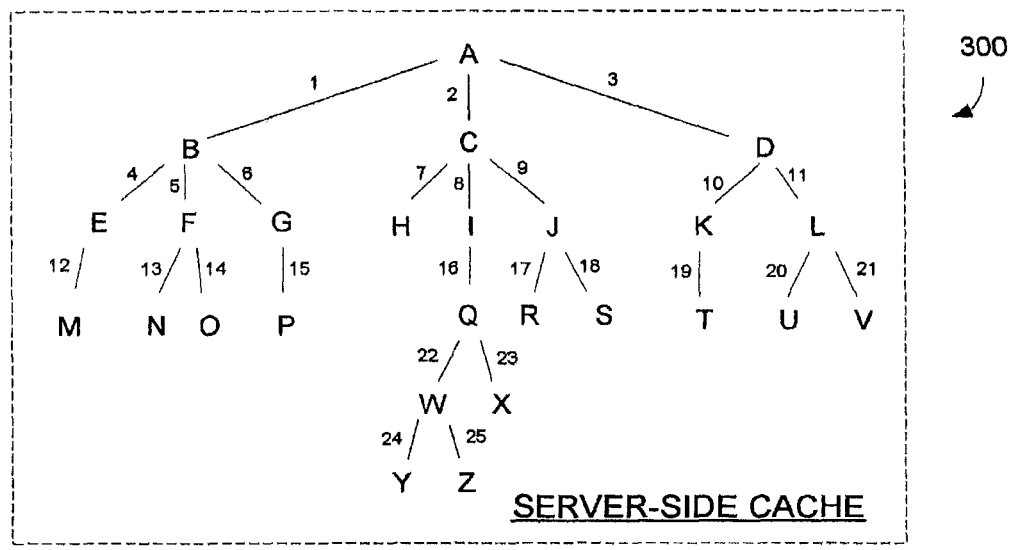
FIG. 3A is a diagram of an exemplary tree-structured hierarchical server-side cache.
Figure 3B:
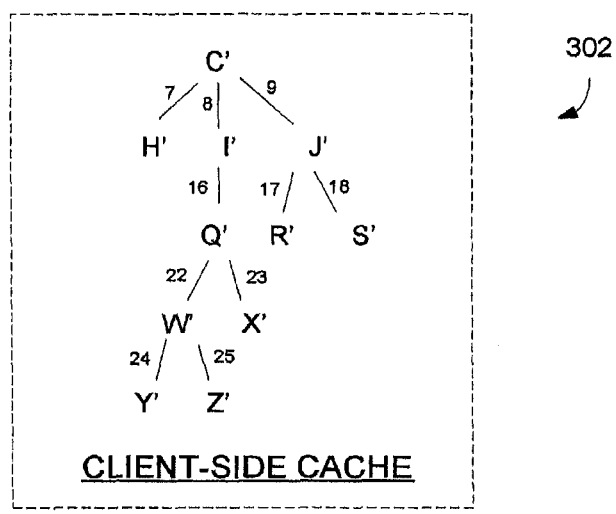
FIG. 3B is a diagram of an exemplary tree-structured hierarchical client-side cache.
Figure 3C:
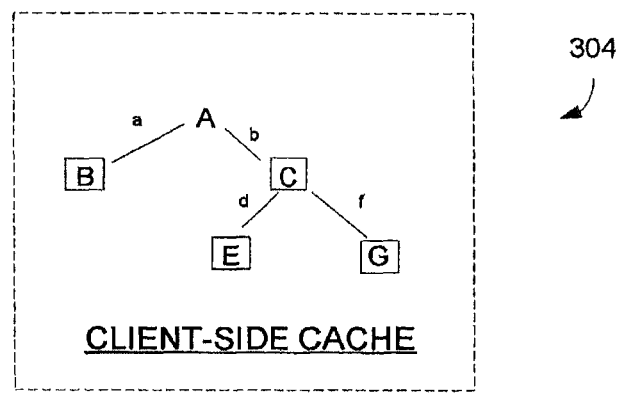
FIG. 3C is a diagram of an exemplary tree-structured hierarchical client-side cache.

With reference to FIGS. 3A and 3B, exemplary diagrams of a tree-structured hierarchical server-side cache 300 and a tree-structured hierarchical client-side cache 302, respectively, are depicted. With reference to FIG. 3A the server-side cache 300 includes nodes A-Z and edges 1-25. As is depicted in FIG. 3B the client-side cache 302 includes a subset of the data stored in the server-side cache. As is depicted in FIG. 3B a current (root) node C' is present in the client-side cache. The node C' corresponds to the node C in the server-side cache 300. Similarly, nodes H', I', J' and Q', R', S' are also included within the client-side cache. As previously noted, the client-side cache is a subset of the server-side cache. As noted above, each node in the server-side cache may contain more information than is represented in a corresponding node of the client-side cache. For example, the node C in the server-side cache of FIG. 3A, includes the same state data as the node C' of the client-side cache. However, as previously discussed, the node C of the server-side cache may also include additional information, such as the number of visits to the node and a timestamp for the node that is not included within the node C'.

Figure 3D:
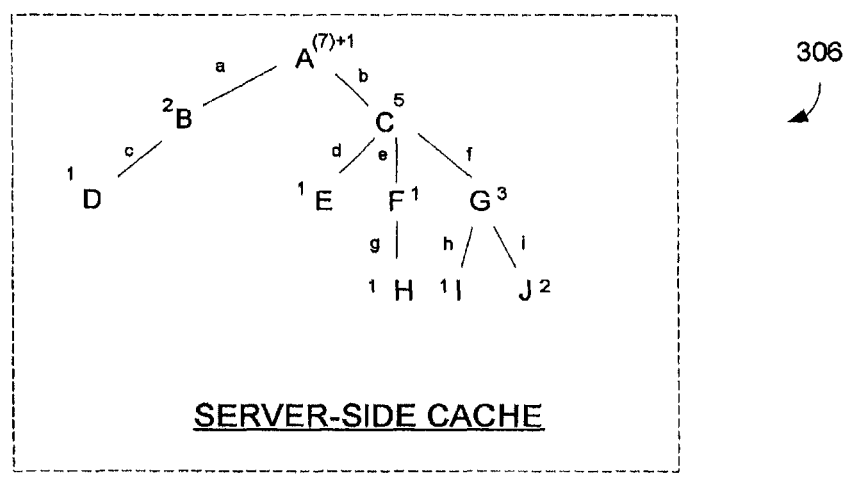
FIG. 3D is a diagram of an exemplary tree-structured hierarchical server-side cache.
Figure 3E:
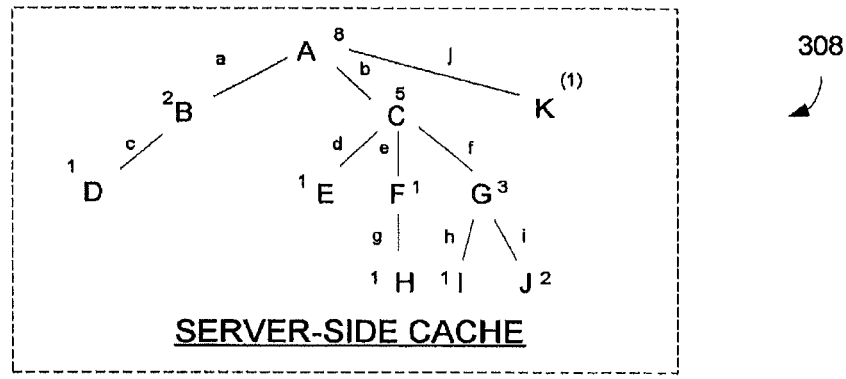
FIG. 3E is a diagram of an exemplary tree-structured hierarchical server-side cache.
Figure 3F:
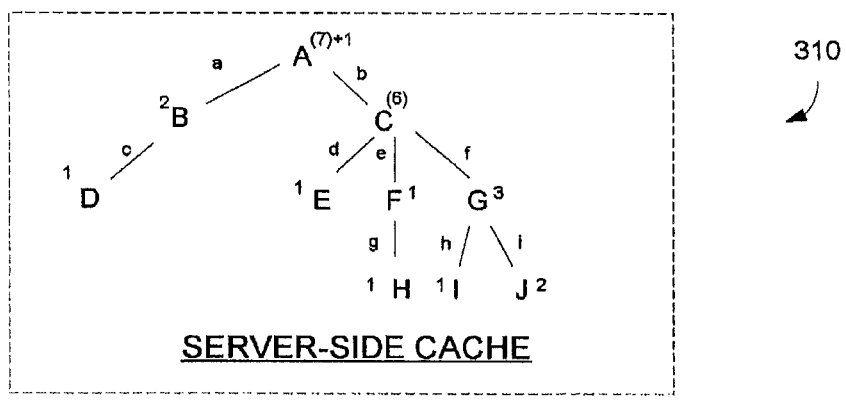
FIG. 3F is a diagram of an exemplary tree-structured hierarchical server-side cache.
Figure 3G:
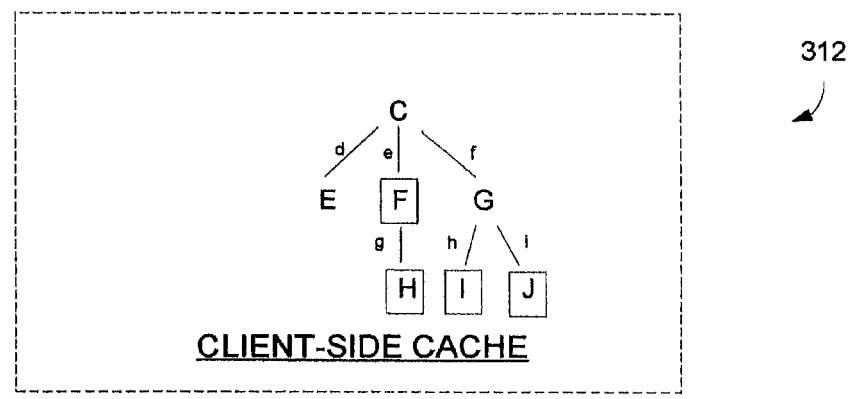
FIG. 3G is a diagram of an exemplary tree-structured hierarchical client-side cache.

With reference to FIGS. 3C-3G, states of a client-side cache or a server-side cache are depicted for a number of exemplary transactions between a server and a client. With specific reference to FIG. 3C, an exemplary client-side cache 304 is depicted after an initial request for data corresponding to node A. As is depicted, in this example, data for four nodes (i.e., nodes B, C, E and G) have been prefetched based upon the initial request for data corresponding to node A. A state of server-side cache 306 after the prefetch of data to the client-side cache 304 is depicted in FIG. 3D. After the initial request, the server has updated a visit count for node A from an initial visit count of 7 to 8 (i.e., 7+1). With reference to FIG. 3E, an operation j performed on the client has caused the server-side cache 308 to be updated to include data for new node K, while the server provides the data for node K to the client-side cache. In this example, data previously residing in the client-side cache for node A is discarded and, as such, at this point in time no prefetch data resides in the client-side cache. With reference to FIG. 3F, an operation b, instead of j, performed on the client causes a visit count for node C of server-side cache 310 to be updated, while the server provides prefetch data from nodes F, H, I and J, which is merged into client-side cache 312.

Figure 4:
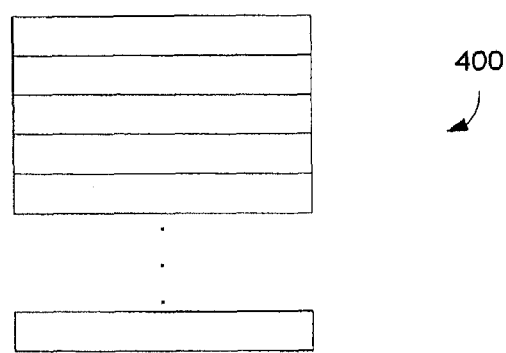
FIG. 4 is a diagram of an exemplary operation queue implemented within a server or client.

FIG. 4 depicts a diagram of an operation queue 400 which may be implemented within both the server and the client. As previously discussed, the operation queue within the client is utilized to store operations corresponding to inputs received from a user, via a UI, until a response is received to a previous server request. Upon receiving a response to a previous server request, the operations stored in the operation queue may be provided to the server. On the server-side, the server stores operations received from the client in a server-side operation queue to insure that the operations are performed in order and, thus, the server can correctly maintain a current state of the client.

Figure 5A:
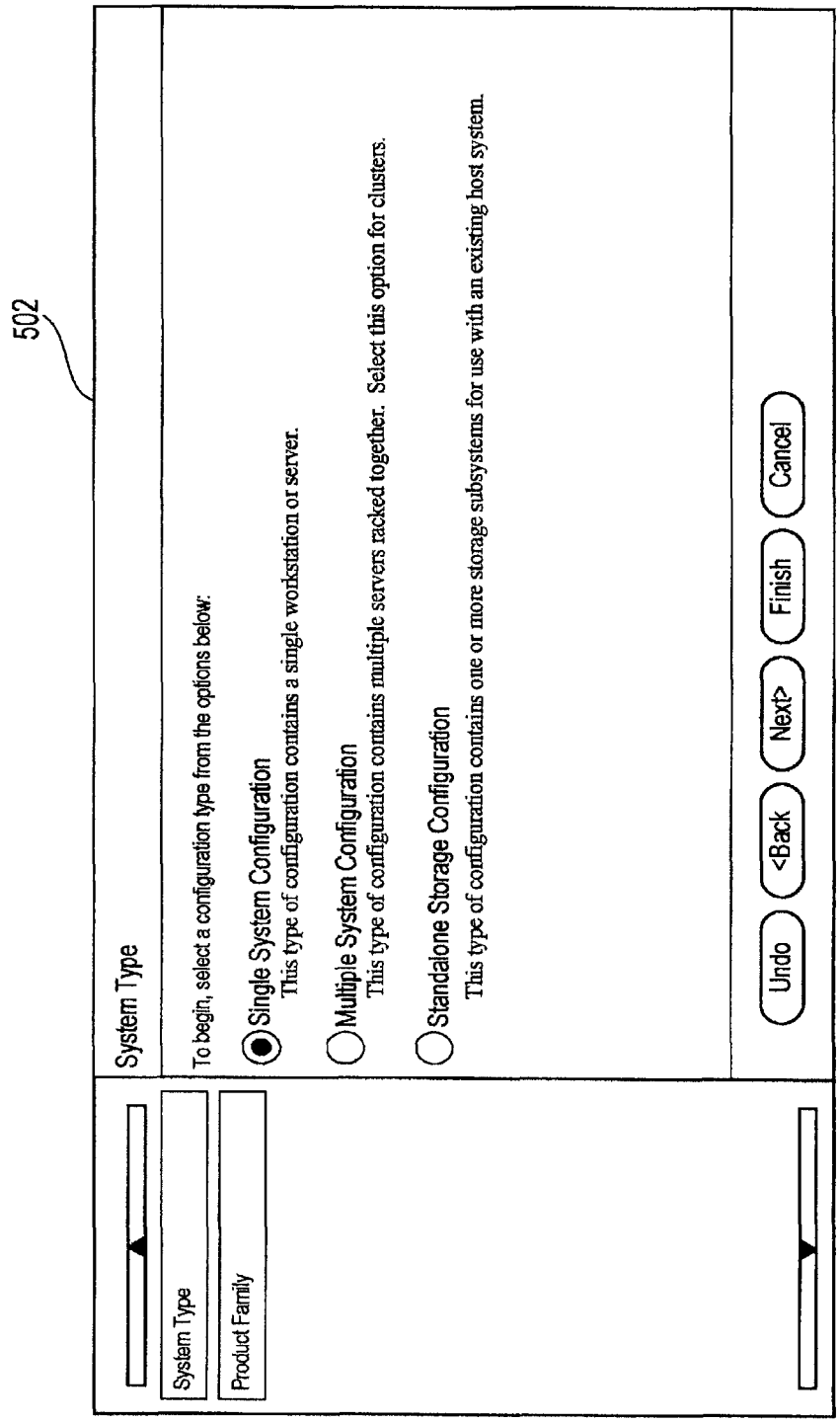

With reference to FIGS. 5A and 5B, exemplary screen dumps associated with a client user interface (UI) are depicted. A server cache may be encoded as a number of XML files on a disk. For example, an exemplary hierarchical tree (represented as XML Code Listing A) is detailed below. In the exemplary code set forth in XML Code Listing A, each node of the tree is represented using a "Node" element. The actual state is stored in separate XML files given by the values of the "StateXML" attribute (e.g., 101.xml through 126.xml).

Use of the client-side cache can be selectively enabled for particular usage scenarios of the application. In the case of a configuration wizard, the client-side cache can be enabled only for particular configuration models. If a model is not configured to use the client-side cache, the client receives a response from the server for every refresh of the UI. When an exemplary wizard is launched, the client requests a response that displays the wizard. The request may be made to, for example, a central dispatching page (Dispatch.jsp in the example) providing parameters (e.g., pbName and pbVersion) that identify the model to be used. For example, the following HTTP request may be utilized:
POST /site/cvdev/Dispatch.jsp HTTP/1.1
TWCSESSIONID=fcm81a6y5h4xgdngvjf1cmxv&
CVAction=SELECT_AND_LAUNCH&.Current-
State=ConfigViews&pbName=Everest&pbVersion=
2.3.108/10/2005_04%3A11%3A17 HTTP/1.1
The server responds based on whether the model (obtained from the pbName and pbVersion parameters) is configured to use a client-side cache. For example, the pseudocode set forth below can be used for implementation.

```
model = get the configuration model specified by the
        parameters
if (model supports client-side cache) {
    send Flash code capable of constructing a client-side cache,
        and displaying the current state of the configuration to
        the client browser
}
else {
    send a normal HTML representation of the state of the
        configuration to the client browser
}
```

In the case where Flash code is sent as the response, this client code makes an HTTP request (through the xMLHttpRequest call) to another dispatch page (ClientConfig.jsp in the example) to obtain XML representing a state of model, along with any pre-fetched data.
POST site/cvdev/ClientConfig.jsp?TWCSESSIONID=
fcm81a6y5h4xgdngvjf1cmxv&prefetchDepth=2
HTTP/1.1
A typical response from the server includes an XML representation of the current state of the wizard and pre-fetched wizard states for potential paths from the present state.

The example code set forth in XML Code Listing B (below) represents an exemplary response from a server. The screen dump 502 of FIG. 5A depicts an initial state of the wizard. The indicate portion (lines 42-98) of XML Code Listing B corresponds to a next state of the wizard, after a user selects 'Multiple System Configuration' (Control id: 1108) and then selects 'Next' (Control id: 12324), and corresponds to the screen dump 504 of FIG. 5B.

When the client needs to update the state of the wizard, the following exemplary request may be sent to the server:
POST site/cvdev/ClientConfig.jsp?TWCSESSIONID=
fcm81a6y5h4xgdngvjf1cmxv&prefetchDepth=2
HTTP/1.1
selectionLog=<SelectionLog><Operation>
<Control value="1" name="1108" type="Radio"/>
<Control value="Clicked" name="12324"
type="Button"/>
</Operation></SelectionLog>&cacheOnly=true
The selectionLog parameter specifies the operations performed by user on the UI. The cacheOnly parameter informs the server to only send pre-fetch data. When this parameter is absent or is set to false, the server will also send the current state along with any pre-fetch data.
Exemplary Cache States and Responses To facilitate understanding by persons of ordinary skill in the art, we illustrate certain exemplary states using partial hierarchies of cached information represented using XML-style information encodings. For example, XML Code Listing A (which appears below) is an exemplary XML-style encoding of a portion of an exemplary server-cache hierarchy consistent with a server-side state that could exist in a system that exploits some techniques of the present invention. Similarly, XML Code Listing B (which also appears below), represents a response (again as an exemplary XML-style encoding) that could be supplied and includes possible user interfaces states in system that exploits some techniques of the present invention.

XML Code Listing A

```
1    <ReflexCacheTree>
2     <Node Operation="1108=true;12324=Clicked"
3         StateXML="106.xml" Visits="2" Transition="false"
4         Error="false" Timestamp="1144067998765">
5      <Node Operation="1079=true" StateXML="107.xml"
6          Visits="1" Transition="false" Error="false"
7          Timestamp="1144067973671">
8       <Node Operation="12324=Clicked" StateXML="108.xml"
9           Visits="1" Transition="false" Error="false"
10          Timestamp="1144067975437">
11       <Node Operation="1078=Clicked" StateXML="109.xml"
12           Visits="1" Transition="false" Error="false"
13           Timestamp="1144067977265">
14        <Node Operation="12324=Clicked"
15            StateXML="110.xml" Visits="1"
16            Transition="false" Error="false"
17            Timestamp="1144067979515">
18         <Node Operation="12324=Clicked"
19             StateXML="111.xml" Visits="1"
20             Transition="false" Error="false"
21             Timestamp="1144067980593">
22          <Node Operation="12324=Clicked"
23              StateXML="112.xml" Visits="1"
24              Transition="false" Error="false"
25              Timestamp="1144067981671">
26           <Node Operation="12324=Clicked"
27               StateXML="113.xml" Visits="1"
28               Transition="false" Error="false"
29               Timestamp="1144067982843">
30            <Node Operation="12324=Clicked"
31                StateXML="114.xml" Visits="1"
32                Transition="false" Error="false"
33                Timestamp="1144067983812">
34             <Node Operation="1=Clicked"
35                 StateXML="115.xml" Visits="1"
36                 Transition="false" Error="false"
37                 Timestamp="1144067987046"/>
38            </Node>
39           </Node>
40          </Node>
41         </Node>
42        </Node>
43       </Node>
44      </Node>
45     </Node>
46     <Node Operation="1001=server900_p1"
47         StateXML="116.xml" Visits="1" Transition="false"
48         Error="false" Timestamp="1144068001718">
49      <Node Operation="12324=Clicked" StateXML="117.xml"
50          Visits="1" Transition="false" Error="false"
51          Timestamp="1144068002828">
52       <Node Operation="1078=Clicked" StateXML="118.xml"
53           Visits="1" Transition="false" Error="false"
54           Timestamp="1144068004781">
55        <Node Operation="1030=pedestal preference"
56            StateXML="119.xml" Visits="1"
57            Transition="false" Error="false"
58            Timestamp="1144068010484">
59         <Node Operation="12324=Clicked"
60             StateXML="120.xml" Visits="1"
61             Transition=\"false" Error="false"
62             Timestamp="1144068011875">
63          <Node Operation="12324=Clicked"
64              StateXML="121.xml" Visits="1"
65              Transition="false" Error="false"
66              Timestamp="1144068013515">
67           <Node Operation="12324=Clicked"
68               StateXML="122.xml" Visits="1"
69               Transition="false" Error="false"
70               Timestamp="1144068014468">
71            <Node Operation="12324=Clicked"
72                StateXML="123.xml" Visits="1"
73                Transition="false" Error="false"
74                Timestamp="1144068015781">
75             <Node Operation="12324=Clicked"
76                 StateXML="124.xml" Visits="0"
77                 Transition="false" Error="false"
78                 Timestamp="1144068016906"/>
79            </Node>
80           </Node>
81          </Node>
82         </Node>
83        </Node>
84       </Node>
85      </Node>
86     </Node>
87    </Node>
88    <Node Operation="12324=Clicked" StateXML="101.xml"
89        Visits="1" Transition="false" Error="false"
90        Timestamp="1144067950796">
91     <Node Operation="1001=server200 pl"
92         StateXML="102.xml" Visits="1" Transition="false"
93         Error="false" Timestamp="1144067953312">
94      <Node Operation="12324=Clicked" StateXML="103.xml"
95          Visits="1" Transition="false" Error="false"
96          Timestamp="1144067954718">
97       <Node Operation="1029=everest 100mhz cpu;12324=
98           Clicked" StateXML="104.xml" Visits="1"
99           Transition="false" Error="false"
100          Timestamp="1144067958171">
101       <Node Operation="12324=Clicked"
102           StateXML="105.xml" Visits="1"
103           Transition="false" Error="false"
104           Timestamp="1144067960109"/>
105      </Node>
106     </Node>
107    </Node>
108   </Node>
109  </Node>
110 </ReflexCacheTree>
```

XML Code Listing B

```
1  <Response twcsessionid="fcm81a6y5h4xgdngvjf1cmxv">
2   <WizResponse>
3    <Screen>
4     <TabControl type="complete" jumpButton="12320">
5      <TabRow>
6       <Tab id="336" icon="367" text="System Type"
7           active="true">system_type_panel</Tab>
8       <Tab id="329" icon="366" text="Product
9           Family">productline panel</Tab>
10      </TabRow>
11     </TabControl>
12     <Frame id="413" type="complete">
13      <Controls>
14       <Control id="12201" type="button" visible="false"
15           refresh="true">Advanced</Control>
16       <Control id="12323" type="button" enabled="false"
17           refresh="true">< Back</Control>
18       <Control id="12324" type="button"
19           refresh="true">Next ></Control>
20       <Control id="12325" type="button"
21           refresh="true">Finish</Control>
22       <Control id="2" type="button"
23           refresh="true">Cancel</Control>
24       <Control id="6575" type="check"
25           visible="false">Engine Trace</Control>
26       <Control id="3" type="button"
27           refresh="true">Undo</Control>
28      </Controls>
29     </Frame>
```

XML Code Listing B

```
30      <Panel id="336" desc="System Type" type="complete">
31        <Controls>
32          <Control id="1107" type="radio" value="true"
33            group="1">Single System Configuration</Control>
34          <Control id="1108" type="radio" group="1">
35            Multiple System Configuration</Control>
36          <Control id="1109" type="radio" enabled="false"
37            group="1">Standalone Storage
38            Configuration</Control>
39        </Controls>
40      </Panel>
41    </Screen>
42 => <ReflexCache depth="0">
43      <Action opr="1108=true;12324=Clicked">
44        <Screen>
45          <TabControl type="rowUpdate">
46            <TabRow>
47              <Tab id="336" icon="367" text="System
48                Type">system_type_panel</Tab>
49              <Tab id="329" icon="366" text="Product Family"
50                active="true">productline_panel</Tab>
51            </TabRow>
52          </TabControl>
53          <Frame id="413" type="diff">
54            <Controls>
55              <Control id="12323" enabled="true"/>
56            </Controls>
57          </Frame>
58          <Panel id="329" desc="Product Family"
59            type="complete">
60            <Controls>
61              <Control id="1001" type="combo" refresh="true">
62                <Option value="server200_pl"
63                  selected="true">Everest Series 200
64                  Everest Series 200
65                  1
66                  32 to 512 MB
67                  3 (2 PCI, 1 PCI/EISA)
68                  13500</Option>
69                <Option value="server900_pl">Everest Series 900
70                  Everest Series 900
71                  8
72                  64 to 4096 MB
73                  6 (4 PCI, 2 PCI/EISA)
74                  85000</Option>
75              </Control>
76              <Control id="1102" type="text">A low-end
77                NT/Unix server with maximum
                  2 CPUs</Control>
78              <Control id="1073" type="combo" enabled="false"
79                refresh="true">
80                <Option value="plfilter_server"
81                  selected="true">Server</Option>
82                <Option value="plfilter_workstation">
83                  Workstation</Option>
84              </Control>
85              <Control id="1028" type="combo" enabled="false"
86                refresh="true">
87                <Option value="plfilter_unix"
88                  selected="true">Everest UNIX</Option>
89                <Option value="plfilter_win95">Windows
90                  95</Option>
91                <Option value="plfilter_nt">Windows
92                  NT</Option>
93              </Control>
94              <Control id="1079" type="check"
95                refresh="true">Use Filter</Control>
96            </Controls>
97          </Panel>
98 =>     </Screen>
99        <Action opr="1079=true">
100         <Screen>
101           <Frame id="413" type="diff">
102             <Controls/>
103           </Frame>
104           <Panel id="329" desc="Product Family"
105             type="diff">
106             <Controls/>
107           </Panel>
108         </Screen>
109       </Action>
110     </Action>
111   </ReflexCache>
112 </WizResponse>
113 <ServerURL type="submit"
114   url="http://localhost:8000/site/cvdev/
115   ClientConfig.jsp"/>
116 </Response>
```

Other Embodiments

Embodiments may be provided as a computer program product, or software, that may include one or more machine-readable media having encoded therein instructions, which may be used to program a computer system (or other electronic device(s)) to perform a process according to embodiments of the invention. A machine readable medium can include any article or mechanism for encoding information in a form (e.g., as software, source or object code, functionally descriptive information, etc.) readable by a machine (e.g., a computer) including transient storage incident to transmission of the information. A machine-readable medium may include, but is not limited to, magnetic storage media (e.g., disks and/or tape storage); optical storage medium (e.g., CD-ROM, DVD, etc.); magneto-optical storage media; read only memory (ROM); random access memory (RAM); erasable programmable memory (e.g., EPROM and EEPROM); flash memory; or other types of media suitable for storing instructions, operation sequences, functionally descriptive information encodings, etc. In some cases, information may be embodied as an electrical, optical, acoustical or other form of propagated signal (e.g., using carrier waves, infrared signals, digital signals, etc.), using a wireline, wireless, or other communications medium.

Many variations, modifications, additions, and improvements are possible. For example, while particular client/server configurations and user interface sessions typical of certain configurator and/or wizard-based applications have been described in detail herein, adaptations for other configurations and user interface session characteristics will also be appreciated by persons of ordinary skill in the art. For instance, the description refers to a tree structure comprising nodes and children of the nodes stored in a hash table. The described structure is intended to aid in understanding the described embodiments, and not meant to be limiting. For example, a cache may be structured as a tree, a hash table, a structure with elements of both a tree and a hash table (as described above), a structure with elements of a variety of data structures, etc. Furthermore, while techniques and mechanisms have been described using particular network configurations, hardware architectures, memory organizations and particular protocols and operating system constructs as a descriptive framework, persons of ordinary skill in the art will recognize that it is straightforward to modify such implementations for use in systems that support other processor instruction set architectures, other network or memory configurations and/or other protocol or operating system constructs.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
receiving input via a user interface (UI) of a client, the input indicating an operation of a state-based client-server application, wherein the UI is associated with the state-based client-server application, and wherein the operation indicates a state transition from a current state to a new state of the state-based client-server application;
supplying a server with a client request; and
receiving from the server a subset of a hierarchy of data units pre-computed and stored at the server, each data unit of the subset corresponding to a respective one of a plurality of successive states of the state-based client-server application that may follow the new state, the subset including a first data unit that corresponds to a subsequent state of the plurality of successive states that may follow the new state.

2. The method of claim 1, further comprising:
merging the first data unit into a client-side cache associated with the client,
wherein the client-side cache is a tree-structured hierarchical cache that includes a cache tree, and wherein merging the first data unit into the client-side cache includes:
determining a first node of the cache tree that corresponds to the first data unit; and
merging the first data unit into the cache tree at the first node.

3. The method of claim 1, further comprising:
updating a display of the UI based on the merged first data unit of the clientside cache.

4. The method of claim 1, further comprising:
updating a display of the UI based on a second data unit different than the first data unit, the second data unit corresponding to another state following the current state alternatively to the subsequent state; and
discarding the merged first data unit from the client-side cache.

5. The method of claim 1, further comprising:
prior to receiving the subset from the server, queuing the operation within a client-side operation queue, the client-side operation queue maintaining an order of operations associated with the state-based client-server application.

6. The method of claim 5, further comprising:
after receiving the subset from the server, providing to the server a batch request indicating entries of the client-side operation queue.

7. A server-client system comprising:
a server that predictively supplies display update data corresponding to one or more user interface (UI) states of a state-based client-server application that are subsequent to a new UI state of the state-based client-server application; and
a client that caches the predictively supplied display update data prior to receiving user input corresponding to the one or more subsequent UI states of the state-based client-server application.

8. The server-client system of claim 7,
wherein the display update data is predictively supplied based on a client request that includes a field for indicating either a prefetch-only request or an operation corresponding to the new state in addition to requesting prefetch data corresponding to states of the one or more UI states following the new state.

9. The server-client system of claim 8,
wherein the field has a value indicating a prefetch-only request, and
wherein the server determines that state data corresponding to the one or more subsequent UI states should be prefetched to the client.

10. The server-client system of claim 8,
wherein the field has a value indicating the operation corresponding to the new state in addition to requesting prefetch data corresponding to the one or more subsequent UI states,
wherein the server supplies to the client state data corresponding to the new state in addition to prefetch data corresponding to the one or more subsequent UI states, and
wherein the indicated operation indicates a change of state of the state-based client-server application from a current state to the new state.

11. The server-client system of claim 7,
wherein the predictively supplied display update data is a subset of display update data stored at the server.

12. The server-client system of claim 7,
wherein the display update data is retrieved from a second server that is distinct from the server that predictively supplies display update data.

13. The server-client system of claim 7,
wherein the display update data is stored at the server.

* * * * *